MAGNETIC AMPLIFIER HAVING NON-LINEAR RESPONSE CHARACTERISTIC

Filed Aug. 5, 1957 4 Sheets-Sheet 1

Inventor:
Hugh M. Ogle,
by Robert G. Spiegel [signature]
His Attorney.

MAGNETIC AMPLIFIER HAVING NON-LINEAR RESPONSE CHARACTERISTIC

Filed Aug. 5, 1957 4 Sheets-Sheet 2

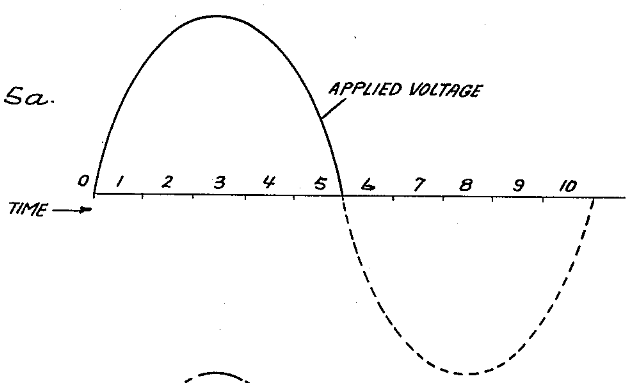

Fig. 5a.

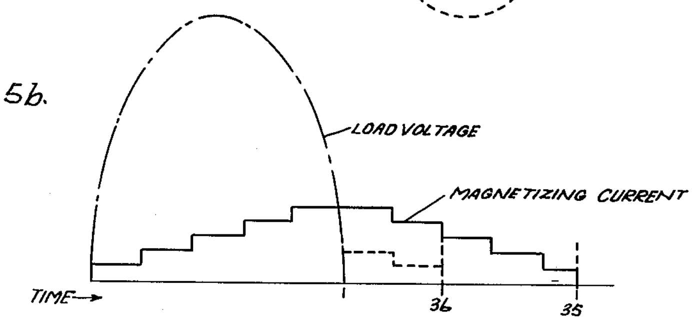

Fig. 5b.

Fig. 6.

| | | | | | | | | | | | | | | | | | | |
|---|---|---|---|---|---|---|---|---|---|---|---|---|---|---|---|---|---|---|
| TIME INTERVALS | CORE NO. | 6 | | | 5 | | | 4 | | | 3 | | | 2 | | | LOAD | | |
| | BIAS LEVEL | + 2 | | | + 1 | | | 0 | | | −1 | | | −2 | | | | | |
| | CONTROL LEVEL | >−2 | 0 | +2 | >−2 | 0 | +2 | >−2 | 0 | +2 | >−2 | 0 | +2 | >−2 | 0 | +2 | >−2 | 0 | +2 |
| 0 | | S− | S+ | S+ | S− | S+ | S+ | S− | S+ | S+ | S− | S− | S+ | S− | S− | S+ | | | |
| 1 | | U | S+ | S+ | S− | S+ | S+ | S− | S+ | S+ | S− | U | S+ | S− | S− | S+ | | | X |
| 2 | | S+ | S+ | S+ | U | S+ | S+ | S− | S+ | S+ | S− | S+ | S+ | S− | U | S+ | | | X |
| 3 | | S+ | S+ | S+ | S+ | S+ | S+ | U | S+ | S+ | S− | S+ | S+ | S− | S+ | S+ | | X | X |
| 4 | | S+ | S+ | S+ | S+ | S+ | S+ | S+ | S+ | S+ | U | S+ | S+ | S− | S+ | S+ | | X | X |
| 5 | | S+ | S+ | S+ | S+ | S+ | S+ | S+ | S+ | S+ | S+ | S+ | S+ | U | S+ | S+ | | X | X |
| 6 | | S+ | S+ | S+ | S+ | S+ | S+ | S+ | S+ | S+ | S+ | S+ | S+ | U | U | S+ | | | |
| 7 | | S+ | S+ | S+ | S+ | S+ | S+ | S+ | S+ | S+ | U | U | S+ | S− | S− | S+ | | | |
| 8 | | S+ | S+ | S+ | S+ | S+ | S+ | U | S+ | S+ | S− | S− | S+ | S− | S− | S+ | | | |
| 9 | | S+ | S+ | S+ | U | S+ | S+ | S− | S+ | S+ | S− | S− | S+ | S− | S− | S+ | | | |
| 10 | | U | S+ | S+ | S− | S+ | S+ | S− | S+ | S+ | S− | S− | S+ | S− | S− | S+ | | | |

Inventor:
Hugh M. Ogle.
by [illegible]
His Attorney.

MAGNETIC AMPLIFIER HAVING NON-LINEAR RESPONSE CHARACTERISTIC

Filed Aug. 5, 1957

4 Sheets-Sheet 3

Inventor:
Hugh M. Ogle,
by Robert G. Swing
His Attorney.

MAGNETIC AMPLIFIER HAVING NON-LINEAR RESPONSE CHARACTERISTIC

Filed Aug. 5, 1957 4 Sheets-Sheet 4

Inventor:
Hugh M. Ogle,
by Robert G. Sries
His Attorney.

3,016,486
Patented Jan. 9, 1962

3,016,486

MAGNETIC AMPLIFIER HAVING NON-LINEAR RESPONSE CHARACTERISTIC

Hugh M. Ogle, Palo Alto, Calif., assignor to General Electric Company, a corporation of New York Filed Aug. 5, 1957, Ser. No. 676,340
7 Claims. (Cl. 323—89)

This invention relates to magnetic amplifiers and more particularly to a magnetic amplifier having a non-linear response characteristic.

The term "magnetic amplifier" has been broadly applied to any static device employing saturable core reactors to provide amplification or control. The saturable core reactors employed in magnetic amplifier circuits generally have a core formed of magnetic material having a substantially rectangular dynamic hysteresis loop, i.e., the plot of flux density (B) against magnetizing force (H). When such core materials are used, the core of the reactor can be made to change from saturation in one direction to saturation in the opposite direction in response to a small change in magnetizing force; such reactors are therefore commonly referred to as sharply saturating. Saturable core reactors have a further characteristic of displaying very high impedance when their cores are unsaturated and very low impedance when saturated.

A magnetic amplifier in the broadest sense includes a saturable core reactor with its winding, referred to as a "gate" winding, connected in series with a load and a source of alternating current. It will thus be readily understood that when the reactor core is unsaturated so that the reactor displays high impedance, minimum current will flow in the gate winding-load circuit and conversely when the reactor core is saturated with the reactor displaying low impedance, maximum current will flow in the circuit. By causing the reactor core to go into saturation at some point during a half-cycle of applied alternating current voltage, it will be seen that the load current will be small during the first part of the half-cycle and large during the remainder. By varying the point at which the core goes into saturation, referred to as the saturation or firing angle, the duration of the impulses of high-value load current and thus the average value of load current as read by a direct current ammeter can be varied.

The saturation angle of a given core may be varied by providing it with a predetermined magnetomotive force (M.M.F.) so that after each half-cycle of applied alternating current voltage, the core returns to a predetermined point on its dynamic hysteresis loop or B–H characteristic. This is referred to as the bias or resetting M.M.F. and may be provided by a bias winding on the core energized by a predetermined direct current. It will readily be seen that with the core beginning each half cycle at a predetermined point on its B–H curve, as established by the bias or resetting M.M.F., the remaining M.M.F. to drive the core into saturation is provided by the flow of current in the gate winding; as the resetting M.M.F. is varied, the gate winding M.M.F. to drive the core into saturation and thus the saturation angle correspondingly varies. Since a small change in the bias or resetting voltage (also referred to as the control signal) will provide a large change in the saturation angle and thus the average load current, it is seen that a small control signal can be made to control a large load current.

The response characteristic, i.e., the variation of average load current in response to variation of control signal, of conventional magnetic amplifiers is substantially linear; each change in control signal produces a substantially directly proportional change in average load current.

There are instances, however, particularly in magnetic logic circuits and digital control devices now used in computer technology, where it is desirable to provide an output signal which varies non-linearly in response to a control signal variation, i.e., a given change in control signal provides a given change in output whereas a further change in control signal provides a change in output which is not directly proportional to the previous change. Magnetic amplifier switching circuits have in the past been provided which will not fire, i.e., pass load current, at a given control signal level, but which will fire at another control signal level. So far as I am aware, however, there has not been provided a magnetic amplifier circuit having a non-linear control characteristic in which different load currents are provided in response to a range of control signals, the load currents not varying directly proportional to the variation in control signals, but rather in a non-linear fashion.

I have discovered that a non-linear response characteristic may be provided for a magnetic amplifier by providing a composite B–H characteristic made up of a plurality of different B–H characteristics. Since the response characteristic of the magnetic amplifier conforms to the configuration of the B–H characteristic thereof, such a composite B–H characteristic will provide a non-linear response characteristic.

It is therefore an object of this invention to provide a magnetic amplifier having a non-linear response characteristic.

Another object of this invention is to provide a magnetic amplifier having a composite B–H characteristic made up of a plurality of different B–H characteristics.

Further objects and advantages of this invention will become apparent and the invention will be better understood by reference to the following description and the accompanying drawings, and the features of novelty which characterize this invention will be pointed out with particularity in the claims annexed and forming a part of this specification.

This invention in its broader aspects provides a magnetic amplifier having a plurality of cores, each core having a different resetting M.M.F. level, the different resetting M.M.F. levels being provided by different bias signals, forming the cores of magnetic materials having different B–H characteristics, or a combination thereof. The magnetic amplifier thus has a composite B–H characteristic which is made up of the B–H characteristic of each separate core and a resultant non-linear response characteristic is therefore provided.

Figures 1, 2, 3, 4:
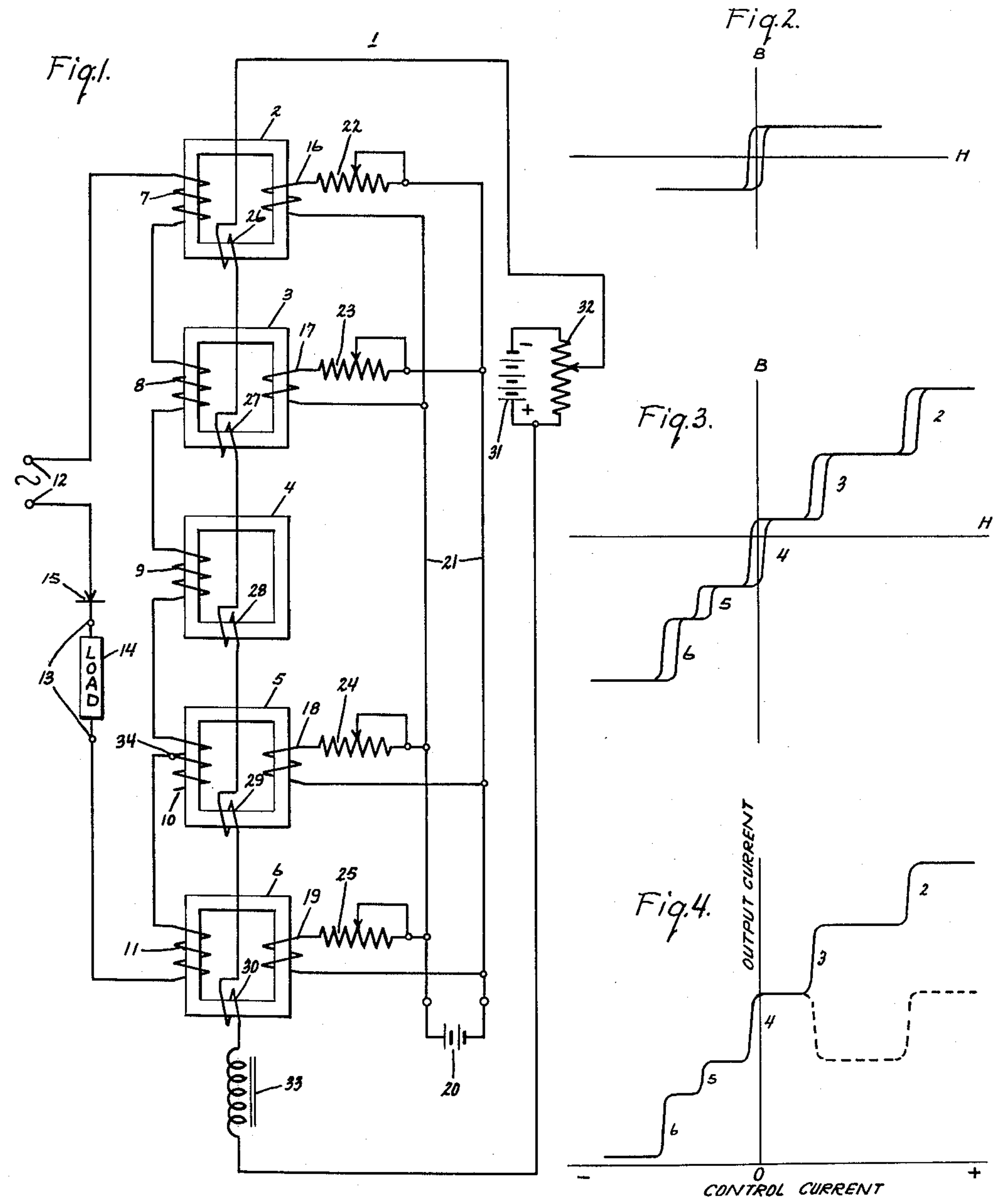
FIG. 1 is a schematic diagram of a half-wave self saturating magnetic amplifier (commonly referred to as an amplistat) incorporating the preferred embodiment of this invention.
FIG. 2 shows the B–H characteristic of one of the cores of FIG. 1.
FIG. 3 shows the composite B–H characteristic of the magnetic amplifier of FIG. 1.
FIG. 4 shows the resultant control characteristic of the magnetic amplifier of FIG. 1.
Figure 7:
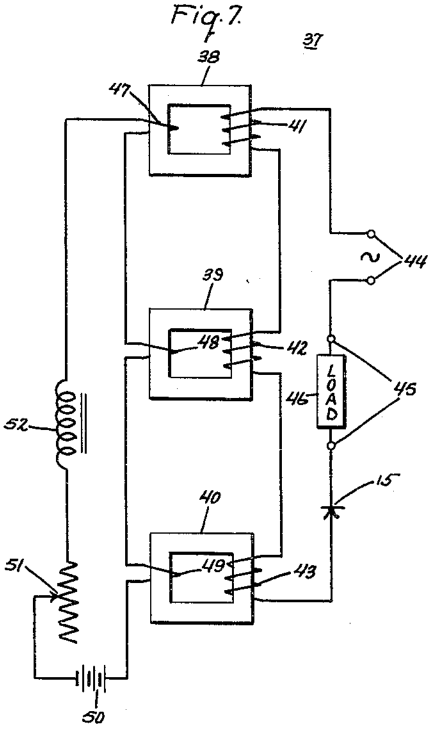
Figure 8A:
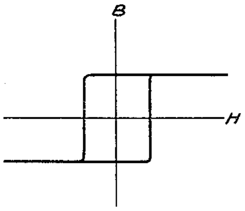
Figure 9:
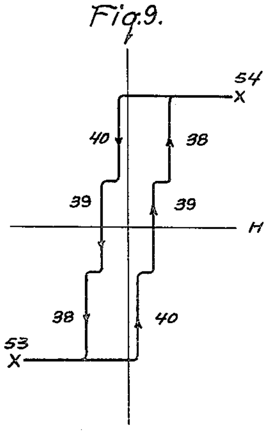
Figure 10:
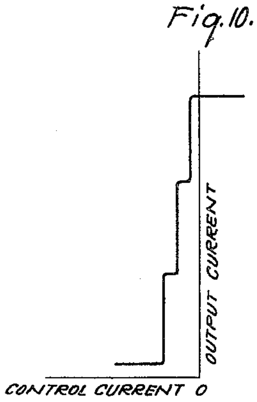
Figure 11:
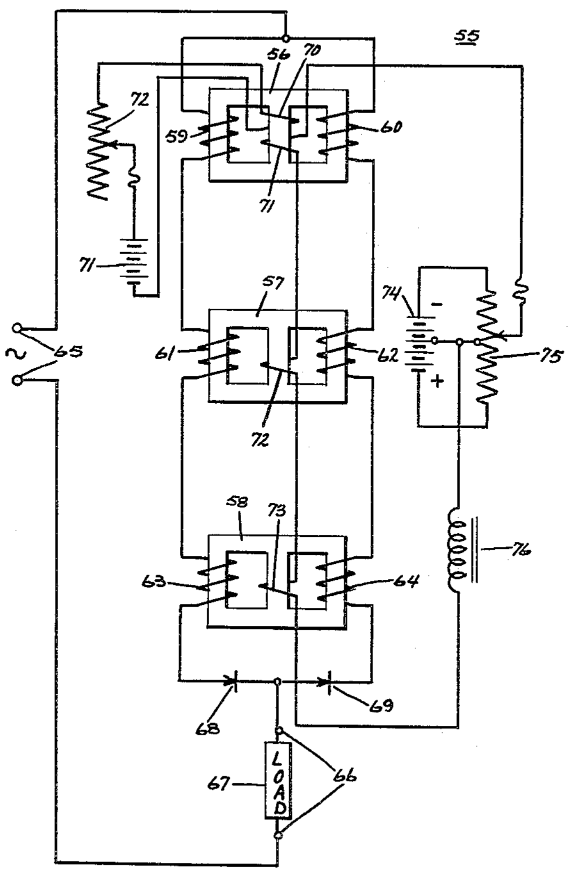
Figure 12:
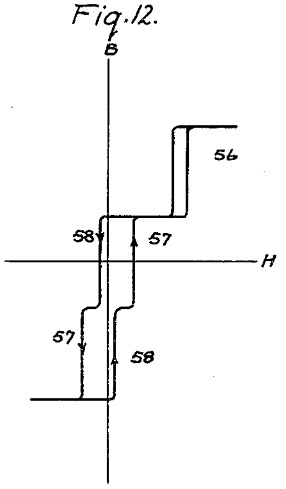
Figure 13:
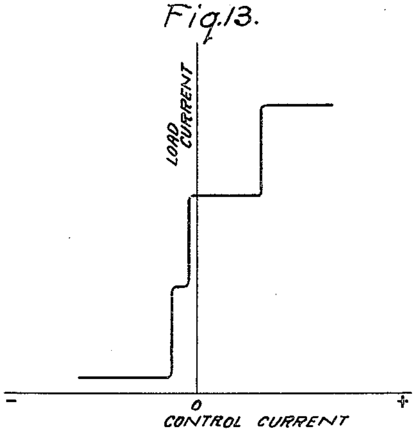

FIGS. 5*a*, 5*b* and FIG. 6 are used to explain the mode of operation of the magnetic amplifier of FIG. 1;

FIG. 7 shows another magnetic amplifier incorporating another embodiment of this invention;

FIGS. 8*a*, *b*, and *c* show the B–H characteristics of the respective cores of the magnetic amplifier of FIG. 7;

FIG. 9 shows the composite B–H characteristics of the magnetic amplifier of FIG. 7;

FIG. 10 shows the control characteristic of the magnetic amplifier of FIG. 7;

FIG. 11 is a schematic diagram showing a full wave self saturating magnetic amplifier circuit (commonly referred to as a doubler circuit) incorporating yet another embodiment of this invention;

FIG. 12 shows the composite B–H characteristic of the magnetic amplifier of FIG. 11; and FIG. 13 shows the control characteristic of the magnetic amplifier of FIG. 11.

Referring now to FIG. 1 of the drawing, there is shown schematically a half wave self saturating magnetic amplifier circuit, generally identified as 1, having five saturable cores 2, 3, 4, 5 and 6. The saturable cores 2 through 6 inclusive are respectively provided with alternating current gate windings 7 through 11 inclusive which are connected in series as shown. A pair of alternating current input terminals 12 are provided adapted to be connected to an external source of alternating current (not shown), such as a source of 400 cycle current. A pair of output or load terminals 13 are provided adapted to have a suitable load 14 connected thereto and a suitable half wave rectifier 15, such as a selenium rectifier, is provided, the serially connected gate windings 7 through 11 inclusive being connected in series with the load terminals 13, the rectifier 15 and the alternating current input terminals 12 as shown.

The cores 2, 3, 5 and 6 are provided with direct current bias windings 16 through 19, respectively, which are energized from a source of direct current, such as battery 20 by lines 21. Each of the direct current bias windings 16 through 19 inclusive respectively has a voltage adjusting potentiometer 22 through 25 connected in series therewith, these potentiometers serving to provide adjustably predetermined bias voltages on the bias windings 16 through 19. It will now be observed that the direct current bias windings 16 and 17 are connected across lines 21 in one sense thereby respectively to provide predetermined bias or resetting M.M.F.'s in the cores 2 and 3 whereas bias windings 18 and 19 are connected across line 21 in the opposite sense thereby to provide resetting M.M.F.'s in the opposite direction respectively in cores 5 and 6. Cores 2 through 6 inclusive are also respectively provided with direct current control windings 26 through 30 inclusive respectively connected in series. The direct current control windings 26 through 30 are connected to be energized from a suitable source of direct current, such as battery 31 through a potentiometer 32 by which a selectively variable direct current voltage of either polarity may be impressed upon the control windings. A suitable choke 33 is connected in series with the direct current control windings 26 through 30 in order to filter out alternating current voltages induced in the control winding circuit by transformer action from the alternating current gate windings 9 through 11 inclusive. Not all of gate winding 10 is shown as being connected in the gate winding circuit, the gate winding 11 being connected to tap 34 on gate winding 10 for a reason to be hereinafter brought out.

Assuming that each of the cores 2 through 6 inclusive is formed of the same magnetic material and that this material has a sharply saturating characteristic, i.e., a substantially rectangular dynamic hysteresis loop, the B–H characteristic of each of the cores 2 through 6 is shown in FIG. 2. Assuming, now, that bias winding 16 has a maximum negative direct current voltage impressed thereon, that bias winding 17 has a lesser negative voltage impressed thereon, that bias winding 19 has a maximum positive bias impressed thereon and that bias winding 18 has a lesser positive direct current voltage impressed thereon, with it being observed that core 4 is provided with no bias winding and thus has no resetting M.M.F. other than that provided by control winding 28, the composite B–H characteristic shown in FIG. 3 is provided for magnetic amplifier 1.

Referring now specifically to FIG. 3, the horizontal displacement of each individual B–H characteristic either to the right or to the left of the vertical B axis is determined by the degree of bias whereas the vertical displacement on either side of the horizontal H axis is merely determined by the flux linkages in the individual cores. Thus, it is seen that with all the cores saturated in the positive direction, the magnetic amplifier 1 is operating at a point on the horizontal line at the extreme upper right hand corner of the B–H characteristic 3 whereas with all of the cores saturated in the negative direction, the device is operating on the horizontal line at the extreme lower left hand corner of the B–H characteristic 3. It is thus seen that the characteristic of core 2 is displaced the farthest to the right by virue of its maximum negative bias, the characteristic of core 3 is displaced somewhat less to the right due to its lesser negative bias, core 4 by virtue of having no bias is equally disposed on either side of the vertical B axis, and likewise, the core characteristic of 6 due to its maximum positive bias is displaced the farthest to the left of the B axis whereas the characteristic of core 5 due to its somewhat lesser positive bias is displaced a lesser amount to the left of the B axis of FIG. 3. The vertical height of the characteristics of each of the cores 2 through 6, as indicated above, is determined by its flux linkage characteristic, it now being observed that the vertical height of the characteristic of core 5 is less than the height of the characteristics of the other cores by virtue of the connection of gate winding 11 to tap 34 of gate winding 10 and the resultant connection of less turns of gate winding 10 in series with the remaining gate windings.

Referring now to FIG. 4, the control characteristic, i.e., the plot of variation of output current in response to variation in control current substantially follows the left hand side of the B–H characteristic and thus the control characteristic of FIG. 4 is obtained from the composite B–H characteristic of FIG. 3 and it is readily seen that the output current varies in a non-linear manner in response to variations in control current. It will now be readily seen that the shape of the response characteristic of the magnetic amplifier 1 may be readily varied; the axial displacement of each step may be varied by varying the bias on the corresponding cores whereas the vertical displacement may be varied by varying the turns in the gate winding of each core. The inverted characteristic shown in the dotted line in FIG. 4 may be provided by reversing the connection of the gate winding 8 on core 3.

Referring now to FIGS. 5*a*, 5*b* and 6, the mode of operation of the magnetic amplifier 1 for three different levels of control current will be explained. FIG. 5*a* shows the alternating current voltage applied to the gate windings 7 through 11, which is assumed to be sinusoidal, FIG. 5*b* shows the magnetizing current and load current flowing in the gate winding-load circuit, while FIG. 6 is a chart showing the saturation condition of the cores during a complete cycle of applied voltage for three different levels of control current. Assume now that the bias adjusting resistors 22 through 24 are adjusted so that core 6 has two positive units of bias current, core 5 has one positive unit of bias current, core 3 has one negative unit of bias current and core 2 has two negative units of bias current. It will also be assumed that the control current is slightly in excess of two negative units. It will be seen that the applied voltage curve and the curve showing magnetizing and load current has been divided into ten time intervals; each half cycle has five intervals corresponding to the five cores shown in FIG. 1.

With the bias currents and control current set forth above and at zero interval, it will be seen that core 6 is saturated in a negative direction by virtue of the control current which is slightly in excess of two units and thus overcomes the two units of positive bias current, core 5 will be saturated in a negative direction since the (2+) units negative of control current far exceeds the one positive unit of bias current and cores 4, 3, and 2 are likewise saturated negatively by virtue of the (2+) units of negative control current. At the time zero instant, therefore.

all of the cores 2 through 6 are saturated in a negative direction and thus have low impedance so that there is an immediate tendency for a high value of current flow in the gate winding-load circuit. The current therefore increases very rapidly in the load circuit at the beginning of the positive-half cycle of applied voltage, this current being in positive direction. This rapid increase in current at the very beginning of interval 1 will drive core 6 out of its saturated condition in the negative direction so that it is unsaturated. Core 6 therefore immediately displays very high reactance and the current flow through the circuit is limited to the value determined by the net impedance of the circuit. The remaining cores 5, 4, 3, and 2 remain in their previous saturated negative condition. At the end of the first interval, the current flowing in reactor 6 has been sufficient to drive it into saturation in the positive direction and again instantaneously, all of the reactors are saturated, reactor 6 in the positive direction and the remaining reactors in the negative direction. The impedance of the circuit thus again becomes very low and the current again tends to increase very rapidly, this second increase in current being sufficient to drive reactor 5 out of saturation again causing a great increase in the impedance and an abrupt termination of the increase in current. This progressive changing during each time interval of a reactor from saturation in one direction to its unsaturated condition and then saturation in the other direction continues through the end of interval 5, it being observed that at all times, except for the momentary and instantaneous condition at the beginning of each interval when all of the reactors are saturated, that there is no time interval in which all of the reactors are saturated during the entire time interval and thus minimum average load current flows. This is therefore the condition shown in the extreme lower left hand corner of the response characteristic of FIG. 4 with maximum negative control current.

During the positive half cycle of applied voltage, the magnetizing current flowing in the gate windings has followed the stepped characteristics shown in solid lines in FIG. 5*b*, reaching its maximum at the end of interval 5. At this point, the applied voltage goes negative and the rectifier 15 tends to prevent the flow of current in a reverse direction. Gate windings 7 through 11 inclusive, however, have substantial inductive reactance by virtue of their being positioned on magnetic cores 2 through 6 inclusive and thus they have a tendency to cause current to continue to flow in the direction in which it was flowing even though the applied voltage has reversed. The magnetizing current therefore continues to flow during interval 6 at the level reached during interval 5 with reactor 2 being unsaturated. This magnetizing current can continue to flow in the forward direction through the rectifier 15 since the alternating current input terminals 12 are connected to a low impedance source. At the end of interval 6, the magnetizing current has decayed sufficiently that reactor 2 becomes saturated in the negative direction under the influence of the control current and reactor 3 likewise becomes unsaturated. The magnetizing current therefore goes down during the remaining intervals in substantially the same steps as it increased from intervals 1 through 5 until point 35 on FIG. 5*b* at which the rectifier 15 finally completely blocks the current and no current flows in the gate winding-load circuit during the remaining part of the cycle. It will be understood that rectifier 15 must at some time short of the complete cycle of applied voltage block the flow of magnetizing current and sustain an inverse vo'tage in order to balance out the forward drops of the circuit.

Assume now that the control current has been advanced from the maximum negative value of slightly less than three units to zero value. At time zero interval, we find core 6 saturated positively by virtue of the two units of positive bias current, core 5 likewise saturated to one unit positively, core 4 saturated positively, since, while it has no bias, it has completed its previous cycle of operation at the extreme upper right hand side of its B–H loop and thus can be said to be saturated due to residual magnetization, and cores 3 and 2 are saturated negatively under the influence of their respective bias currents. Here again with all cores momentarily saturated, the net impedance of the circuit is very low and there is a tendency for the current therein to increase very rapidly. During interval 1, this increase in current drives reactors 6, 5, and 4 even further into saturation in the positive direction but drives reactor 3 from its saturated negative condition into its unsaturated condition with reactor 2 staying saturated in the negative direction. Here again, there is a great increase in the net impedance of the circuit which causes an abrupt termination in the rapid increase in the current in the circuit and the current therefore follows the same characteristic during the first interval as the current in the first interval with maximum negative bias current. At the end of the first interval, reactor 3 has been driven into saturation in the positive direction and again all the reactors are momentarily saturated, so that there is a second tendency for a very rapid increase in current. This next increase in current de-saturates reactor 2 again increasing the net impedance of the circuit and terminating the rapid increase in current. At the end of interval 2, the current has driven reactor 2 into saturation in the positive direction and we now find that all of the reactors are in the saturated condition in a positive direction. Since there is no other reactor to be driven from saturation in one direction to saturation in the other direction during this interval, the current increases to a much higher value as shown in dashed lines in FIG. 5*b* and the applied voltage essentially appears across the load as indicated by the X in the load column of FIG. 6. With this value of control current, all of the reactors remain saturated during intervals 3, 4, and 5 and thus load current flows during these intervals. At the end of interval 5, load current is blocked by rectifier 15 and the magnetizing current again flows in that direction as explained herein above beginning at the same level at which the reactors fired to pass load current, i.e., the level prevailing at the end of interval 2. The magnetizing current again decays, this time, however through only one step and is blocked by rectifier 15 at point 36.

Considering now the condition of maximum positive control current, at the zero time interval it is seen that all of the cores are saturated in the positive direction, i.e., there is no core to be driven from saturation negative to saturation positive and thus load current immediately flows and continues to flow throughout the cycle being blocked at the end of interval 5 by the rectifier 15. The presence of the applied voltage across the load by virtue of the very low impedance of the reactors 2 through 6 under this condition is shown by the X's in the appropriate column under load in FIG. 6.

It will now be seen that with different levels of control current from maximum negative through maximum positive, all of the reactors become saturated at different intervals throughout the positive half cycle of applied voltage, the average level of load current which is reached and the firing point being determined by the control characteristic of FIG. 4.

It will be readily apparent that the five cores 2 through 6 are shown by way of illustration only and that the nonlinear response characteristic can be obtained with any number of cores from two upwards. The one unbiased core 4 is provided in order to position the composite B–H characteristic and the response characteristic on either side of the vertical axis and thus it is seen that a finite value of output current is provided with zero control current. The composite B–H characteristic and the response characteristic can readily be shifted entirely to the positive side or the negative side of the vertical axis by providing bias for all of the cores either in the positive or negative direction.

Referring now to FIGS. 7 through 10 inclusive, there is shown a saturable core device 37 having three saturable cores 38, 39, and 40. Alternating current gate windings 41 through 43 are respectively provided on the cores 38 through 40 and are again connected in series. Alternating current input terminals 44 are adapted to be connected to an external source of alternating current (not shown) and load terminals 45 are adapted to be connected to an external load device 46. The serially connected gate windings 41 through 43 are again serially connected with the alternating current input terminals 44 and the load terminals 45. The cores 38, 39 and 40 are respectively provided with direct current control windings 47 through 49 which are likewise serially connected across a suitable source of direct current voltage such as battery 50, variable resistor 51 being provided to vary the control current passed through the control windings 47 through 49 and choke 52 being provided to filter the alternating current voltages which are induced in the control windings 47 through 49 by transformer action from the alternating current gate windings 41 through 43. In the embodiment of FIG. 7, each of the cores 38 through 40 is formed of magnetic material having a different B–H characteristic. For example, core 38 may be formed of material such as grain oriented silicon steel having a relatively wide substantially rectangular B–H characteristic as shown in FIG. 8*a*, core 39 may be formed of magnetic material such as deltamax having a somewhat narrower substantially rectangular B–H characteristic as shown in FIG. 8*b* and core 40 may be formed of materials such as supermalloy having a narrow substantially rectangular B–H characteristic as shown in FIG. 8*c*. The positive B–H characteristic of the magnetic amplifier of FIG. 7 is shown in FIG. 9 and it will be seen that as the cores 38, 39 and 40 go from saturation in the negative direction to saturation in the positive direction, i.e., for example from point 53 on the line at the lower left hand corner of FIG. 9 to point 54 at the upper right hand corner thereof, core 40 first goes out of saturation and then into saturation in the opposite direction followed by cores 39 and 38. When the cores go back from saturation in one direction as at point 54 to saturation in the opposite direction as at point 53, the same sequence is followed, namely core 40 reverses its saturation followed by cores 39 and 38, thus giving the composite characteristic of FIG. 9. As indicated previously, the response characteristic of the device follows the left hand side of the composite B–H characteristic thus yielding the response characteristic of FIG. 10 which again shows that the output current varies non-linearly in response to variations in control current. It is here seen that the net difference in resetting M.M.F. for each core is provided by the different B–H characteristics of the cores and the control windings 47, 48 and 49.

Referring now to FIGS. 11, 12 and 13, there is shown a self saturating full wave magnetic amplifier circuit 55, generally referred to as a doubler circuit, having three saturable cores 56, 57 and 58. The saturable cores 56 through 58 are shown as being of the three-legged variety and respectively have alternating current gate windings 59 and 60, 61 and 62, and 63 and 64 arranged thereon as shown. A pair of alternating current input terminals 65 are again provided adapted to be connected to an external source of alternating current and a pair of load terminals 66 are provided adapted to be connected to a load device 67. The gate windings 59, 61 and 63 on the one hand and 60, 62 and 64 are respectively serially connected with the serially connected gate windings 59 and 61 and 63 being connected in series with a half wave rectifier 68, input terminals 65 and load terminals 66 and the serially connected gate windings 60, 62 and 64 likewise being connected in series with half wave rectifier 69, alternating current input terminals 65 and load terminals 66. Core 56 is provided with a direct current bias winding 70 arranged on its center leg and connected for energization from a suitable source of direct current, for example battery 71 with serially connected adjustable resistor 72 being provided to selectively adjust the predetermined bias voltage level on direct current bias winding 70. The cores 56, 57, and 58 also respectively have direct current control windings 71, 72, and 73 respectively arranged on their center legs and connected in series, the serially connected control windings 71, 72 and 73 being energized from a suitable source of direct current such as battery 74 with a potentiometer 75 again serving selectively to vary the polarity and level of the direct current voltage applied to the control windings. Choke 76 again serves to filter alternating current induced in the control windings 71, 72 and 73 by transformer action from the gate windings 59 through 64.

Figure 8B:
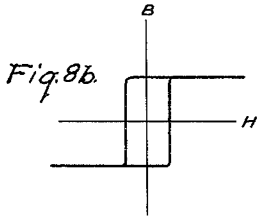
Figure 8C:
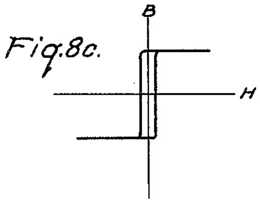

The cores 57 and 58 are formed of magnetic material having different B–H characteristics, for example, similar to those shown in FIGS. 8*b* and 8*c* while as indicated previously, core 56 has a predetermined direct current bias impressed thereon. This provides a composite B–H characteristic as shown in FIG. 12 with the B–H characteristic of core 56 being displaced axially to the right of the vertical axis by virtue of the bias provided by direct current bias winding 70 and the characteristics of cores 57 and 58 having the same configuration as the corresponding characteristics of cores 39 and 40 of FIG. 7. The composite B–H characteristic of FIG. 12 provides the response characteristic of FIG. 13, it being observed that with this arrangement, load current which responds non-linearly to variations in control current is again provided and with an intermediate level of load current being provided with no control current. It is thus seen that the combination of separate direct current bias and different core materials may be used to provide different resetting levels necessary to provide the non-linear response characteristic.

It will now be readily apparent that my arrangement for providing a magnetic amplifier with a non-linear response characteristic is applicable to any conventional form of magnetic amplifier, either of the type having extrinsic feed back or of the self saturating type. It is further apparent that this arrangement is also applicable to half wave and full wave magnetic amplifiers having either direct current or alternating current output.

It will now be readily apparent that I have provided an arrangement applicable to any conventional magnetic amplifier circuit in which a non-linear response characteristic is provided by utilizing a plurality of cores with serially connected gate windings and with each core having a different resetting M.M.F. level.

While I have illustrated and described particular embodiments of this invention, further modifications and improvements will occur to those skilled in the art. I desire that it be understood therefore that this invention is not limited to the specific form shown and I intend in the appended claims to cover all modifications which do not depart from the spirit and scope of this invention.

What I claim as new and desire to secure by Letters Patent of the United States is:

1. A magnetic amplifier having a non-linear response characteristic comprising: a plurality of saturable cores each having a gate winding and a direct current control winding, said gate windings and said control windings being respectively serially connected; an alternating current input circuit and a load circuit; said serially connected gate windings being connected in series with said alternating current input and load circuits; circuit connections for impressing a selectively variable direct current signal on said circuit serially connected control windings thereby providing a selectively variable control M.M.F. for all of said cores; at least one of said cores having a direct current bias winding with circuit connections for impressing a predetermined direct current signal thereon thereby providing a predetermined resetting M.M.F. for the respective cores; each of said cores having a different resetting M.M.F. level thereby providing a non-linear response characteristic for said magnetic amplifier.

2. A magnetic amplifier having a non-linear response characteristic comprising: a plurality of saturable cores each having an alternating current gate winding and a direct current control winding, said gate windings and said control windings being respectively serially connected; an alternating current input circuit and a load circuit; said serially connected gate windings being connected in series with said alternating current input and load circuits; circuit connections for impressing a selectively variable direct current signal on said serially connected control windings thereby providing a selectively variable control M.M.F. for all of said cores; at least all except one of said cores having a direct current bias winding; and circuit connections arranged respectively to impress a different predetermined direct current signal on each of said bias windings to establish a different resetting M.M.F. level for the respective cores thereby providing a non-linear response characteristic for said magnetic amplifier.

3. A self saturating magnetic amplifier having a non-linear response characteristic comprising: a plurality of saturable cores each formed of substantially the same magnetic material and each having a gate winding and direct current control winding, said gate windings and control windings being respectively serially connected; rectifying means; a pair of alternating current input terminals and a pair of load terminals; said serially connected gate windings being connected in series with said alternating current input and load terminals and said rectifying means; a pair of direct current control signal terminals adapted to be connected to a source of selectively variable direct current voltage, said serially connected direct current control windings being connected across said direct current control signal terminals thereby providing a selectively variable control M.M.F. for all of said cores; a direct current bias winding on at least all except one of said cores; a pair of direct current bias signal terminals adapted to be connected to a source of fixed direct current voltage; and a plurality of voltage adjusting means respectively connected to each of said direct current bias windings across said direct current bias terminals, said voltage adjusting means being respectively arranged to impress a different predetermined direct current signal in each of said bias windings to establish a different resetting M.M.F. level for the respective cores thereby providing a non-linear response characteristic for said magnetic amplifier.

4. A self saturating magnetic amplifier having a non-linear response characteristic comprising: at least three saturable cores each formed of substantially the same magnetic material and each having a gate winding and a direct current control winding; said gate and control windings being respectively serially connected; rectifying means; a pair of alternating current input terminals and a pair of load terminals; said serially connected gate windings being connected in series with said alternating current input and load terminals and said rectifying means; a pair of direct current control signal terminals adapted to be connected to a source of direct current voltage selectively variable from a predetermined level of one polarity to a predetermined level of the opposite polarity, said serially connected current control windings being connected across said direct current control signal terminal thereby providing a selectively variable control M.M.F. for all of said cores; a direct current bias winding on all except one of said cores; a pair of direct current bias signal terminals adapted to be connected to a source of fixed direct current voltage; voltage adjusting means respectively connecting each of said bias windnigs across said direct current bias terminals; said voltage adjusting means being respectively arranged to impress different predetermined direct current signals on the respective bias windings; at least one of said predetermined direct current signals being of one polarity and at least one other being of the opposite polarity thereby establishing a different resetting M.M.F. level for the respective cores to provide a non-linear response characteristic for said magnetic amplifier.

5. A self-saturating magnetic amplifier having a non-linear response characteristic comprising a plurality of saturable cores each having a gate winding and a direct current control winding; said gate windings and control windings being respectively serially connected; an alternating current input circuit and a load circuit; rectifying means; said serially connected gate windings being connected in series with said alternating current input and load circuits and said rectifying means; and circuit connections for impressing a selectively variable direct current signal on said serially connected control windings thereby providing a selectively variable control M.M.F. for all of said cores; said cores respectively having different dynamic hysteresis loops for establishing a different resetting M.M.F. level for each of said cores to provide a non-linear response characteristic for said magnetic amplifier.

6. A magnetic amplifier having a non-linear response characteristic comprising: at least three saturable cores each having a gate winding and a direct current control winding, said gate and control windings being respectively serially connected; an alternating current input circuit and a load circuit; said serially connected gate windings being connected in series with said alternating current input and load circuits; circuit connections for impressing a selectively variable direct current signal on said serially connected control windings thereby providing a selectively variable control M.M.F. for all of said cores; at least one of said cores having a direct current bias winding with circuit connections for impressing a predetermined direct current signal thereon to provide a predetermined resetting M.M.F. level therefor; at least two other said cores having different shaped dynamic hysteresis loops thereby establishing a different resetting M.M.F. level for each of said cores to provide a non-linear response characteristic for said magnetic amplifier.

7. A self-saturating magnetic amplifier having a non-linear response characteristic comprising: at least three saturable cores each having a gate winding and a direct current control winding, said gate windings and control windings being respectively serially connected; an alternating current input circuit and a load circuit; rectifying means; said serially connected gate windings being connected in series with said alternating current input and load circuits and said rectifying means; circuit connections for impressing a selectively variable direct current signal on said serially connected control windings thereby providing a selectively variable control M.M.F. for all of said cores; at least one of said cores having a direct current bias winding with circuit connections for impressing a predetermined direct current signal thereon to provide a predetermined resetting M.M.F. level therefor; at least two other of said cores having different shaped dynamic hysteresis loops thereby establishing a different resetting M.M.F. level for each of said cores to provide a non-linear response characteristic for said magnetic amplifier.

References Cited in the file of this patent

UNITED STATES PATENTS

| | | |
|---|---|---|
| 2,644,129 | Ramey | June 30, 1953 |
| 2,725,549 | Dunnet | Nov. 29, 1955 |
| 2,765,438 | McHenry | Oct. 2, 1956 |
| 2,775,724 | Clark | Dec. 25, 1956 |
| 2,842,733 | Lilenstein | July 8, 1958 |
| 2,916,689 | Selin | Dec. 8, 1959 |